United States Patent [19]

Stelz et al.

[11] 4,369,120
[45] Jan. 18, 1983

[54] REFRIGERATION LIQUID WITH LEAK INDICATOR AND PROCESS OF USING SAME

[75] Inventors: Dale E. Stelz, Goddard, Kans.; Wilson M. Whaley, Cary; Frank I. Carroll, Durham, both of N.C.

[73] Assignee: Racon Incorporated, Wichita, Kans.

[21] Appl. No.: 265,697

[22] Filed: May 21, 1981

[51] Int. Cl.³ ............................................. C09K 5/04
[52] U.S. Cl. .................................... 252/68; 62/114; 260/378
[58] Field of Search ................ 252/67, 68; 62/114; 260/378

[56] References Cited

U.S. PATENT DOCUMENTS

| | | | |
|---|---|---|---|
| 3,770,640 | 11/1973 | Bartlett | 252/68 |
| 4,083,683 | 4/1978 | Botros | 260/378 |
| 4,170,564 | 10/1979 | Brendle | 252/68 |

*Primary Examiner*—John D. Smith
*Attorney, Agent, or Firm*—P. H. Smolka

[57] ABSTRACT

Compounds of the class represented by 1,4-bis(2-methyl-6-ethylanilino)anthraquinone, 1,4-bis(2,6-dimethylanilino)anthraquinone, and 1,4-bis(2,4,6-trimethylanilino)anthraquinone are disclosed as being unusually stable blue dyes suitable for use as visual leak indicators in refrigerants; e.g., in halocarbon refrigerants, or in refrigeration liquids comprising a halocarbon refrigerant in admixture with a refrigeration oil.

11 Claims, No Drawings

REFRIGERATION LIQUID WITH LEAK INDICATOR AND PROCESS OF USING SAME

BACKGROUND OF THE INVENTION

(1) Field of the Invention

The invention relates to refrigeration liquids that are dyed such that they cause a readily visible stain in the event of a leak in the refrigeration system in which they are used. More particularly, it relates to the use of 1,4-bis(2-methyl-6-ethylanilino)anthraquinone or some of its closely similar homologs as dyes in refrigeration liquids composed essentially of a volatile halocarbon refrigerant and a relatively non-volatile oil serving as a lubricant for the refrigeration apparatus or other vapor compression heat transfer mechanism in which the composition is used. Still more particularly, the invention relates to refrigeration liquids containing an anthraquinone dye that is deep blue in color, that is substantially soluble in the halocarbon as well as the lubricating oil constituting the refrigeration composition, and that has a high degree of stability at the high temperatures and in the chemical environment encountered in a mechanical refrigeration cycle. The invention likewise relates to the use of such dyed refrigeration liquids in a refrigeration process wherein the presence of a stable dye is capable of serving as a conspicuous leak indicator in the event of a leak occurring in the course of a long period of operation.

(2) The State of the Art

It has been known in the art to use various dyes to indicate the occurrence and location of leaks in mechanical refrigeration systems employing refrigerants composed of mixtures of fluorocarbons and a refrigeration oil. For instance, U.S. Pat. No. 3,370,013 describes such a refrigerant composition using an azo dye or a mixture of azo dyes as a leak indicator. Other dyes were proposed previously in U.S. Pat. No. 1,915,965 for a similar purpose. More recently, the use of certain anthraquinone dyes has been proposed for this purpose in U.S. Pat. No. 3,770,640.

However, previously proposed dyes have suffered from one or more disadvantages, notably in terms of insufficient chemical or thermal stability, insufficient solubility in the particular refrigerant composition for which they were intended, relatively complex molecular structure and consequent difficulty in manufacturing them, or unsatisfactory color. Obviously, unless the selected dye is sufficiently soluble both in the volatile halocarbon and in the relatively non-volatile refrigeration oil, leakage of the refrigerant composition containing such a dye will produce an oil stain of insufficient intensity for ready detection.

Proper chemical and thermal stability are particularly important because insufficiently stable dyes gradually change or lose color and may produce a precipitate, thereby losing effectiveness as a leak indicator and impairing the operation of the refrigeration mechanism.

In addition, to yield a commercially acceptable refrigeration composition, the dye (1) must be such as to permit the stains that result in the location of a leak to be easily and essentially completely removed by a solvent such as perchloroethylene, methylene chloride or trichlorofluoromethane; (2) must not cause a significant increase in the pour point of the refrigeration oil; (3) must not have any significant adverse effect on the various materials used in refrigeration apparatus; e.g., elastomeric gaskets, cotton sleeving, mechanical parts made of polyester or nylon; (4) must have no adverse effect on the dielectric strength of the refrigation oil; and (5) must not raise the floc point of the oil.

Adequate solubility of the dye in the halocarbon-containing refrigerant composition as well as the refrigeration oil used in formulating it is of course of major importance. More particularly, it is important that the dye be capable of being dissolved in the refrigerant composition in a sufficient concentration to produce the desired intensely colored stain in the event of a leak without precipitating from the composition as it passes through the various evaporation and compression stages of the refrigeration cycle. And it is particularly important that the solubility of the dye in the relatively non-volatile refrigeration oil be sufficiently high to produce an intensely colored oil stain when the dye-containing composition leaks from the system and the halocarbon refrigerant evaporates, causing the dye present to concentrate in the oil that remains.

Last, but not least, many manufacturers or operators of commercial refrigeration, freezer or air conditioning units or heat pumps insist on using refrigerant compositions that possess an intense blue color, in preference to some other color such as green or red, in order to be able to differentiate a refrigerant leak from a leak of some other fluid in the system; e.g., red motor fuel or hydraulic fluid under the hood of a motor vehicle. The requirement that the dye be blue has further greatly increased the difficulty of finding a dye meeting all the specified requirements.

A narrow class of anthraquinone dyes having a particular characteristic structure has now been found which meets all of the specified requirements in a surprisingly effective manner.

SUMMARY OF THE INVENTION

In the absence of an explicit indication to the contrary, it should be understood at the outset, that amounts and proportions of materials are expressed on a weight basis throughout this specification and claims.

In accordance with one of its aspects, this invention provides a deep blue refrigeration liquid comprising a halocarbon refrigerant and a small but effective amount of a blue anthraquinone dye having a structure corresponding to the following formula:

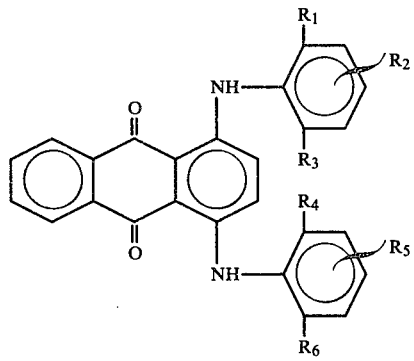

wherein $R_1$, $R_3$, $R_4$ and $R_6$ are each separately selected from the group consisting of methyl and ethyl, and $R_2$ and $R_5$ are selected from the group consisting of hydrogen and methyl, but always with the proviso that the total number of carbon atoms in all the alkyl groups attached to the benzene ring of any given anilino group does not exceed three. The two substituted anilino groups of a particular dye are usually the same because of the relative simplicity of its synthesis, but they may be different. 1,4-Bis(2-methyl-6-ethylanilino)anthraquinone has been found to constitute a particularly outstanding dye for the purposes of this invention, because of its excellent stability, solubility and color qualities. Other suitable dyes include: 1,4-bis(2,6-dimethylanilino)anthraquinone; 1,4-bis(2,4,6-trimethylanilino)anthraquinone, which is also called 1,4-bis(-mesidino)anthraquinone; and 1,4-bis(2,3,6-trimethylanilino)anthraquinone. Still other suitable dyes include: 1-(2-methyl-6-ethylanilino)-4-(2,6-dimethylanilino)anthraquinone; 1-(2,4,6-trimethylanilino)-4-(2,3,6-trimethylanilino)anthraquinone; and so on.

The anthraquinone dyes meeting the requirements of this invention possess a certain characteristic chemical structure that is more fully described below. It is this structure that apparently imparts to such dyes not only an intense blue color, but also a surprisingly high degree of desired thermal and chemical stability as well as solubility.

The dyes suitable for use in this invention must have sufficient solubility in the halocarbon refrigerant so as to impart sufficient color intensity to the refrigeration liquid and eventually to the non-volatile oil stain remaining behind after evaporation of the refrigerant in the event of a leak.

In addition, it is desirable that the solubility of a dye be sufficient to allow its use in a concentration well below its limit of solubility and thereby minimize the risk of the dye's salting out in the refrigeration system.

For instance, it is advantageous for the dye to be soluble in the halocarbon component of the refrigeration liquid in a concentration of at least 0.01% and in the oil component of the refrigeration liquid in a concentration of from between about 0.03% to 1.0% or more. Usually, however, it is sufficient to dissolve the selected dye in the refrigeration liquid, i.e., in the mixture of refrigerant oil and halocarbon refrigerant, in a concentration between about 0.02 to 0.5%, e.g., between about 0.03 and 0.1%, although substantially higher concentrations within the range of solubility of a particular dye in a particular refrigeration liquid may be used if desired.

In another aspect, this invention provides a process for monitoring leaks in a vapor compression heat transfer system by circulating through it the novel refrigeration liquid described above.

FURTHER DESCRIPTION OF THE INVENTION

The novel blue-colored refrigerant compositions of this invention, which serve to indicate leaks occurring in vapor compression heat transfer system, are surprisingly effective in terms of chemical stability, solubility and intensity of the blue stain resulting in the event of a leak. The composition comprises a conventional refrigeration liquid in which from about 0.01 to 1.0%, preferably about 0.02 to 0.5%, and most preferably 0.03 to 0.1% of one or more of the blue anthraquinone dyes described above is dissolved. As halocarbon refrigerants themselves are volatile, it is of course necessary to maintain or store them or refrigeration liquids comprising them in closed containers in order to avoid unwanted evaporation losses.

A refrigeration liquid of the kind to which the present invention is addressed comprises a halocarbon refrigerant mixed with a refined mineral oil having a pour point not higher than about 0° C., e.g., between about −40° C. (−40° F.) and about −65° C. (−85° F.), which serves as a lubricant in the refrigeration system. Instead of mineral oil, suitable synthetic lubricants such as silicone oils, dibasic acid esters or polyglycols may be used similarly. For instance, suitable synthetic oils include 2-ethylhexyl disiloxane, 2-ethylhexyl trisiloxane, esters of polybasic acids such as dibutyl adipate, or various polyglycols, as is otherwise well known. If necessary or desired, a minor proportion of a mineral oil may be used in combination with such synthetic oils in order to increase the solubility of the dyes in the refrigeration liquid to a predetermined level. Because of cost and the solvent effect of many synthetic oils on elastomeric materials such as gaskets used in refrigeration systems, mineral oils are normally preferred to synthetic oils.

Typically, a refrigeration liquid of the kind to which this invention is addressed is a mixture of one or more halocarbon refrigerants and a light lubricating oil having a suitably low pour point or freezing point, wherein the ratio of halocarbon to lubricating oil is from about 10:1 to about 4:6.

As ordinarily sold by manufacturers of halocarbons, the halocarbon refrigerant containing the dye dissolved in it does not contain any substantial proportion of oil, e.g., only between 0 and 2%, usually less than 1% of oil, any such oil being included at this stage mainly to assist in dissolving the dye in the composition. The required proportion of a suitable lubricant is added to the dye-containing refrigerant compositions at a later stage, for instance, by a distributor or the final user.

Halocarbons useful as refrigerants either individually or in the form of azeotropic or non-azeotropic mixtures include:

| Refrigerant Designation | Chemical Name | Normal Boiling Point, °C. |
|---|---|---|
| Aliphatic Compounds | | |
| 11 | Trichlorofluoromethane | 24 |
| 12 | Dichlorodifluoromethane | −30 |
| 12B1 | Bromochlorodifluoromethane | −4 |
| 12B2 | Dibromodifluoromethane | 25 |
| 13 | Chlorotrifluoromethane | −81 |
| 13B1 | Bromotrifluoromethane | −58 |
| 14 | Carbon tetrafluoride | −128 |
| 21 | Dichlorofluoromethane | 9 |
| 22 | Chlorodifluoromethane | −41 |
| 23 | Trifluoromethane | −82 |
| 31 | Chlorofluoromethane | −9 |
| 32 | Methylene fluoride | −52 |
| 40 | Methyl chloride | −24 |
| 41 | Methyl fluoride | −78 |
| 113 | 1,1,2-Trichlorotrifluoroethane | 48 |
| 113a | 1,1,1-Trichlorotrifluoroethane | 46 |
| 114 | 1,2-Dichlorotetrafluoroethane | 4 |
| 114a | 1,1-Dichlorotetrafluoroethane | 4 |
| 114B2 | 1,2-Dibromotetrafluoroethane | 47 |
| 115 | Chloropentafluoroethane | −39 |
| 116 | Hexafluoroethane | −79 |
| 123 | 2,2-Dichloro-1,1,1-trifluoroethane | 27 |
| 124 | 2-Chloro-1,1,1,2-tetrafluoroethane | −12 |
| 124a | 1-Chloro-1,1,2,2-tetrafluoroethane | −10 |
| 125 | Pentafluoroethane | −49 |
| 133a | 2-Chloro-1,1,1-trifluoroethane | 6 |
| 142b | 1-Chloro-1,1-difluoroethane | −10 |
| 143a | 1,1,1-Trifluoroethane | −47 |
| 152a | 1,1-Difluoroethane | −25 |
| 218 | Octafluoropropane | −37 |
| Cyclic Compounds | | |
| C317 | Chloroheptafluorocyclobutane | 26 |
| C318 | Octafluorocyclobutane | −6 |
| Azeotropes or Mixtures | | |
| 500 | R-12/152a(73.8/26.2 wt %) | −33 |
| 501 | R-22/12(75/25 wt %) | −41 |

| Refrigerant Designation | Chemical Name | Normal Boiling Point, °C. |
|---|---|---|
| 502 | R-22/115(48.8/51.2 wt %) | −45 |
| 503 | R-23/13(40.1/59.9 wt %) | −88 |
| 504 | R-32/115(48.2/51.8 wt %) | −57 |
| 505 | R-12/31(78.0/22.0 wt %) | −30 |
| 506 | R-31/114(55.1/44.9 wt %) | −12 |
| — | R-13B1/152a (Non-Azeotrope) | — |

In generic terms, the halocarbon refrigerant is a low-boiling haloalkane or halocycloalkane boiling at a relatively low temperature at atmospheric pressure, e.g., below 30° C., and containing from 1 to 2 carbon atoms if a haloalkane or 1 to 4 carbon atoms if a halocycloalkane, from 1 to 6 fluorine atoms and from 0 to 3 halogen atoms selected from the class consisting of chlorine and bromine. Useful halocarbon refrigerants serve to transfer heat in a refrigeration system by evaporating and absorbing heat at a low temperature and pressure, e.g., at ambient temperature and atmospheric pressure, and by releasing heat of condensing at a higher temperature and pressure.

The refrigeration oils useful in this invention include any of the mineral or synthetic oils that are well known in the art and are commonly used in vapor compression heat transfer apparatus, e.g., naphthenic oils, paraffinic oils, alkylated benzenes, silicones, polyglycols, diesters or triesters of dicarboxylic or tricarboxylic acids or phosphoric acid, and the like. Suitable commercial oils include, among others, "Suniso" 3GS, 4GS or 5GS, which are naphthenic oils manufactured by Sun Co., "Cappela" D or E, which are naphthenic oils manufactured by Texaco, Inc., "Delco" 15-117, a paraffinic oil manufactured by Texaco, Inc. and "Zerice" S-41, an alkylated benzene oil manufactured by Exxon Corporation.

The blue anthraquinone dyes useful in this invention are of a kind that is well known in the art and these dyes can be prepared by otherwise well known methods of synthesis. For instance, 1,4-bis(2-methyl-6-ethylanilino)anthraquinone can be made by condensing leucoquinizarin with 2-methyl-6-ethylaniline and then oxidizing the intermediate product in an otherwise conventional manner. Such a method of synthesis is disclosed in U.S. Pat. No. 4,083,683, which patent discloses and claims the use of this particular dye for dyeing metal-containing polypropylene fibers. More generally speaking, all such dyes may be prepared by reacting a haloanthraquinone with the proper alkyl-substituted aniline in suitable proportions, as disclosed, for example, in U.S. Pat. Nos. 2,091,812 and 2,101,094; or by reacting a diaminoanthraquinone with the proper alkyl-substituted bromobenzene as disclosed in U.S. Pat. No. 2,596,820; or by reacting a dihydroxyanthraquinone with a alkyl-substituted aniline as disclosed in British Pat. No. 248,874.

However, for an anthraquinone dye to be suitable in this invention, it has been found necessary for it to possess anilino groups located both in the 1 position and in the 4 position of an anthraquinone nucleus and to possess small substituents, e.g., $C_1$ or $C_2$ alkyl substituents, in the two ortho positions of each such anilino group. By reference to Table I below it can be appreciated that such ortho substitution has a remarkably beneficial effect on the stability of the dyes in the accelerated sealed tube test used for evaluation. The first three dyes listed, embodying the principles of this invention, routinely withstand in excess of twenty days in the sealed tube test at 350° F. (176.7° C.), equivalent to many years of normal use in a refrigeration system. The remaining twenty dyes listed in Table I do not possess the special structural features described in this invention and therefore fail the sealed tube test in less than ten days, some of them in less than five days.

As a result of a lengthy search for a superior blue dye it finally became clear that the amino nitrogen atoms must be shielded by alkyl groups in the ortho positions of the anilino substituents. At first it was thought that steric shielding alone would be an adequate explanation for the enhanced stability of the claimed dyes, but a number of observations contradict such a simple explanation. For instance, U.S. Pat. No. 3,770,640 reports that 1,4-bis(2,4,6-triethylanilino)anthraquinone was found to be very unstable in the sealed tube test at 400° F. (204.4° C.), even though it possesses ortho substitution on its anilino groups. The higher test temperature does not account for that poor result, because preferred dye No. 1-35 of this invention has been found to be virtually as stable at 402° F. (205.5° C.) as it is at 350° F. (176.7° C.).

Other dyes that provide steric shielding of the amino nitrogen atoms but are nevertheless very unstable are those in Table I with the following anthraquinone substituents: 1,4-bis(neopentylamino) (No. 15-13), 1,4-bis-(N-methylanilino) (No. 16-10), 1,4-bis(N-ethylanilino) (No. 17-14), 1,4-bis(N-methyl-4-n-butylanilino) (No. 18-6), 1,4-bis(N-methyl-4-ethoxyanilino) (No. 19-9), 1,4 bis(N-methyl-4-n-butoxyanilino) (20-12), 1,4-bis(4-n-butylanilino)-2-methyl (No. 22-16) and 1,4-bis(2-trifluoromethylanilino) (No. 23-24). Finally, although 1,4-bis(2,4,6-triethylanilino)anthraquinone has been disclosed in U.S. Pat. No. 3,770,640 among the dyes the patentee considered useful, its stability in the sealed tube test as reported in this reference is so poor as to make this dye commercially unacceptable to the refrigeration industry. 1,4-Bis(N-methyl-4-n-butylanilino)anthraquinone, which likewise falls within the scope of the disclosure of U.S. Pat. No. 3,770,640, has also been found very unstable when prepared and tested. The great instability reported for the 2,4,6-triethylanilino dye and the instability found in the case of the N-methyl-4-n-butylanilino dye made the superior performance of the dyes covered in this invention entirely unanticipated and surprising. The general phenomenon of steric shielding is inadequate to explain their outstanding stability, and no other mechanism is clearly evident.

As already stated, dyes particularly useful in this invention are 1,4-bis(2-methyl-6-ethylanilino)anthraquinone, 1,4-bis(2,6-dimethylanilino)anthraquinone and 1,4-bis(2,4,6-trimethylanilino)anthraquinone and the like. To produce the desired color intensity, it is important that the dye possess the smallest possible molecule that will produce the desired color while having the required stability and solubility.

The degree of purity has been found to affect the stability of the dyes to some extent, but was found to be much less important in the particular dyes used in this invention than has been suggested in the prior art with respect to other anilino anthraquinone dyes. More particularly, U.S. Pat. No. 3,770,640 teaches that in the case of the dyes disclosed there it is highly important that unreacted alkyl aniline reactant be removed from the product dye at least to the extent that less than about 0.5 weight percent of the aniline remains in the dye mixture, implying that the dyes must be chromatographically pure.

By contrast, in the case of the particular class of dyes used in this invention, dye samples having a purity as low as 89% have been found to possess sufficient stability to give a mean life greater than 15 days in the sealed tube test at 350° F., and dye samples having a purity of 95% or more have been found to give a mean life of 24 days or more in this test. Accordingly, while a high degree of dye purity is generally advantageous, the present invention can be successfully operated with dyes that are between 85 and 100% pure, preferably between 90 and 100% pure, and most preferably between about 95 and 98% pure and that do not necessarily require chromatographic purification.

The effect of impurities on dye stability as measured in the sealed tube test is illustrated by the data in the following table:

| EFFECT OF IMPURITIES ON THE STABILITY OF DYE NO. 1-35 | | | |
|---|---|---|---|
| Samples of Dye No. 1-35 | εmax. at 625 nm | Purity, % | Mean Life, Days at 350° F. |
| A and B | 17,553 | 100* | 26.2 |
| C | 17,016 | 97 | 24.0 |
| D | 16,751 | 95 | 24.0 |
| E | 15,500 | 89 | 17.0 |
| F | 11,434 | 65 | 5.0 |

*By definition

The purities in the above table were calculated from spectral absorption data on the basis of the following assumptions: (1) Chromatographically purified samples were assumed to be 100% pure (by definition); (2) Beer's Law was assumed to apply to these dyes; and (3) the impurities were assumed not to absorb light at the wavelength used to calculate the conversion coefficient.

EXAMPLES

To illustrate the effectiveness of the invention, numerous refrigeration liquids containing a variety of anthraquinone dyes were subjected to a standard sealed tube test that the American Society of Heating, Refrigeration and Airconditioning Engineers has proposed for the purpose of determining the stability of refrigeration liquids (See ASHARE Transactions, Jan. 25-28, 1965). Manufacturers of refrigeration equipment generally demand that any refrigeration liquid satisfactorily pass such a sealed tube test before they approve the liquid for use in their equipment. In addition, the solubility of the various dyes in oil and in refrigerant were determined.

The sealed tube test serves as a method of evaluating in an accelerated manner interactions of materials found in a refrigeration system. As can be seen from Table I below, the test results obtained demonstrate the extraordinary stability of ortho substituted anilino dyes in oil/-refrigerant mixtures in the presence of representative metals of construction.

TEST PROCEDURE

Glass tubes and all metal test coupons are scrupulously cleaned. Test refrigerants are distilled to minimize moisture contamination. Moisture is removed from the refrigeration test oil "Suniso" 3GS by subjecting the oil to a vacuum with slight stirring and heating. Ratios of refrigerant/refrigerant oil range from 1:1 to 1:2 by weight.

Refrigerant oil and representative metal coupons of copper #10AWG wire, Swedish valve stock steel, and aluminum metal sheet are placed in a glass tube along with the subject test dye material (0.25-1.0% wt/wt) dissolved in the refrigerant oil. Like samples without the subject dye are analyzed as controls.

The tube and its contents are chilled in a liquid nitrogen bath while the refrigerant is condensed into the tube via a calibrated manometer. The tube is sealed under a vacuum of at least 0.1 torr.

Glass tubes and contents are subjected to uniform heating in a bored aluminum block placed in a temperature-programmed oven.

The oven temperatures used vary according to the test refrigerant, as indicated:

| Refrigerant | Temperature |
|---|---|
| R-12 | 176.7° C. (350° F.) |
| R-22 | 200° C. (392° F.) |
| R-502 | 200° C. (392° F.) |

The test is run for one of the following time periods: 5, 14, 21, 30 or 60 days.

The tube contents may be evaluated by several methods:
Visual examination
Analysis of chloride ion
Gas chromatography analysis
Infrared spectrometry
Mass spectrometry of these methods, the visual examination is the most rapid and the only qualitative method. Any color change in the subject dye coloration is noted when compared to a control sample.

The quantitative methods involve analysis for decomposition products of chloride as hydrochloric acid or organic products by gas chromatography, infrared spectroscopy, or mass spectroscopy. However, visual inspection and gas chromatography are widely used, and they were selected as standardization procedures for evaluation of sealed tube contents.

R-12 is chemically one of the more reactive refrigerants; thus, short term tests with refrigeration liquids containing this refrigerant admixed with a mineral oil yield the most rapid results. R-22 and R-502 are also used but the decomposition products are more difficult to analyze by gas chromatography. Ultimately the test material must pass interactions involving any of these refrigerants. The visual method can be used empirically on a pass-fail basis. As verified experimentally, visual results are considered as valid as instrumental methods.

Solubility of various dyes in various refrigeration oils was carefully determined according to the following standardized procedure. An excess of the subject dye was added to a given weight (e.g., 100 g) of refrigerant oil. The mixture was stirred for one-half hour with mild heating, whereupon it was cooled to room temperature (about 21° C.) and transferred to a centrifuge tube. The mixture was centrifuged approximately 15 minutes at 1000 rpm. A sample of the supernatant liquid was decanted (1.00 g±0.01 g) and diluted to 100 ml volume with methylene chloride. Aliquot portions were taken and read against the principal absorption peaks by visible light spectroscopy. Wt/wt percentage concentrations were then calculated from proper standard curves.

The dye should be soluble in the selected refrigeration oil in a concentration of at least 0.005 g/100 g, preferably at least 0.007 g/100 g, i.e., in a concentration that produces a blue oil solution of sufficient color intensity to serve as a visual leak detector. The upper limit of the concentration range in which the dye is dissolved in the refrigeration liquid for commercial use is generally dictated only by cost considerations and by the need to remain safely below the maximum dye solubility so as to avoid precipitation of the dye from the liquid while in use. As the various dyes that form the basis for this invention are soluble in the ordinarily used refrigeration oils in a concentration of from about 4.5 to about 5 g/100 g, they are readily dissolved in the refrigeration liquid, e.g., in a mixture containing 3 parts of a halocarbon such as dichlorodifluoromethane and 1 part of a naphthenic oil such as Suniso 3GS, in a concentration of between about 0.02 and 0.5%, e.g., 0.1%.

Solubilities of various dyes in various halocarbon refrigerants were also determined according to the following standardized procedure. Approximately 0.1000 g±0.1 mg of the subject dye was dissolved in a small amount of trichlorofluoromethane (refrigerant R-11) and diluted with additional R-11 to 50 ml volume. A 2 ml aliquot was taken and added to a clear glass tube (9 mm OD). The R-11 was allowed to vaporize, leaving a known amount of dye in the bottom portion of the test tube. The tube was then attached to a charging apparatus containing a supply of a given halocarbon refrigerant and various amounts of the refrigerant were charged into the tube while chilling the latter by immersion in liquid nitrogen. The tube containing the dye/refrigerant mixture was sealed under vacuum, allowed to reach room temperature (about 21° C.) and rotated for several hours. Visual inspection of the tube was made at several temperatures to note the degree of dissolution. The procedure was improved over previously used methods in that an exact predetermined amount of dye and refrigerant were made to interact, requiring fewer weighings. Finally, it became possible to use the same tube to check solubility at several different temperatures.

Representative stability data as well as certain solubility data obtained with the various dyes are summarized in Table I. Additional data showing the solubility of various dyes in refrigeration oil are summarized in Table II and further data showing the solubility of various dyes in various refrigerants are summarized in Table III.

TABLE I

BLUE ANTHRAQUINONE DYES
Sealed Tube Data In "R-12" At 350° F.

| Dye No. | Substituents | Stability, Mean Life | Oil Sol. In 3GS | Refr. Sol. In R-12 |
|---|---|---|---|---|
| 1-35 | 1,4-Bis(2-methyl-6-ethylanilino) | 26.2 days | 4.8% | 0.2 |
| 2-31 | 1,4-Bis(2,6-dimethylanilino) | 22.4 | 0.1 | <0.1 |
| 3-25 | 1,4-Bis(mesidino) | 24.3 | 0.55 | <0.1 |
| 4-1 | 1,4-Bis(4-n-butylanilino) | 9.5 | <1.0 | — |
| 5-5 | 1,4-Bis(4-cyclohexylanilino) | 9.7 | 0.1 | — |
| 6-21 | 1,4-Bis(4-t-butylanilino) | 8.7 | 1.0 | — |
| 7-3 | 1,4-Bis(4-ethoxyanilino) | 8.5 | <1.0 | — |
| 8-2 | 1,4-Bis(4-n-butoxyanilino) | 8.6 | 0.02 | — |
| 9-8 | 1,4-Bis($\beta$-phenethylamino) | 4.4 | 0.1 | — |
| 10-19 | 1,4-Bis(benzylamino) | 4.5 | <0.25 | — |
| 11-17 | 1,4-Bis($\alpha$-methylbenzylamino) | 3.5 | 1.0 | — |
| 12-20 | 1,4-Bis(diphenylmethylamino) | 2.0 | <0.05 | — |

TABLE I-continued

BLUE ANTHRAQUINONE DYES
Sealed Tube Data In "R-12" At 350° F.

| Dye No. | Substituents | Stability, Mean Life | Oil Sol. In 3GS | Refr. Sol. In R-12 |
|---|---|---|---|---|
| 13-27 | 1,4-Bis(n-octylamino) | 4.4 | 0.5 | — |
| 14-32 | 1,4-Bis(n-dodecylamino) | 2.3 | 0.5 | — |
| 15-13 | 1,4-Bis(neopentylamino) | 3.4 | <1.0 | — |
| 16-10 | 1,4-Bis(N—methylanilino) | 7.0 | 0.1 | — |
| 17-14 | 1,4-Bis(N—ethylanilino) | 4.5 | 1.0 | — |
| 18-6 | 1,4-Bis(N—methyl-4-n-butylanilino) | 4.3 | 0.1 | — |
| 19-9 | 1,4-Bis(N—methyl-4-ethoxyanilino) | 6.0 | 0.1 | — |
| 20-12 | 1,4-Bis(N—methyl-4-n-butoxyanilino) | 4.0 | 0.1 | — |
| 21-11 | 1-(4-n-butylanilino)-4-(p-toluidino) | 7.7 | 0.1 | — |
| 22-16 | 1,4-Bis(4-n-butylanilino)-2-methyl | 3.0 | 1.0 | — |
| 23-24 | 1,4-Bis(2-trifluoromethylanilino) | 6.5 | 0.5 | — |

The sealed tube data shown in Table I clearly demonstrate the superiority of the dyes falling within the scope of this invention over other, similar dyes. More particularly, the data show that dyes No. 1-35, 2-31 and 3-25, all of which are intensely blue, are unique in having a relatively simple and easily synthesized chemical structure, exhibiting stability in excess of 20 days as measured by the very severe sealed tube test, and having both relatively high solubility in the refrigeration oil and sufficient solubility in the halocarbon refrigerant. Sealed tube data not included in Table I have substantiated that the excellent stability of dye No. 1-35 persists even at much higher test temperatures, i.e., at 402° F., and this dye is particularly preferred. Dyes No. 2-31 and 3-25 have not as yet been tested for stability at such high temperatures, but are expected to perform similarly.

All of the other dyes of the same general type as the dyes of the invention were stable for less than 10 days as measured by the sealed tube test, or had undesirably low solubility in refrigeration oils, or were relatively difficult or uneconomical to prepare because of their chemical structure, and in many cases failed in several of these respects. Obviously, when the final dye contains two differently substituted anilino groups, more steps are required for its synthesis in suitably pure form than when the two anilino moieties of the molecule are the same.

It should be remembered that the dyes preferably should not have an adverse effect on the pour point or the floc point of the refrigeration oil, and the dyes falling within the narrow class of this invention can satisfy this criterion without extensive purification. Preferably the dye used should contain less than about 10%, preferably less than about 5%, of unreacted aniline compounds. A high degree of purity is always advantageous but it is less important to dye stability in the case of the relatively simple chemical structures required in this invention than in the case of other, more complex structures.

The solubility of the preferred dye, 1,4-bis(2-methyl-6-ethylanilino)anthraquinone ("Dye No. 1-35") in various commercially used refrigeration oils was determined. The results are summarized in Table II below.

TABLE II

Dye Solubility in Refrigeration Oils

| Brand of Oil* | Dye Solubility, %(wt/wt) |
|---|---|
| Suniso 3GS | 4.8 |
| Suniso 4GS | 4.6 |
| Suniso 5GS | 4.8 |
| Texaco Cappella D | 4.8 |
| Texaco Cappella E | 4.9 |
| DuPont Zephron 150 | 5.3 |

*The first five refrigeration oils listed are mineral oils of the naphthenic type; Zephron 150 is of the alkyl benzene type.

As those results show, the preferred dye No. 1-35 is soluble in representative naphthenic and alkyl benzene refrigeration oils in a concentration of about 5%, which is very advantageous. Generally speaking, a concentration of at least about 0.02 g dye per 100 g refrigeration oil is required in order to provide a sufficiently dark oil stain to serve as a visual indicator in the event of leakage, and ordinarily the concentration of dye in a commercial refrigeration liquid composed of halocarbon refrigerant and refrigeration oil will be in the range of from about 0.05 to 0.2%. However, it is of great practical importance that the dye used be soluble in the refrigeration oil in a multiple of such concentration, e.g., in a concentration of at least 0.3% and preferably 0.5% or greater. This is desirable in order to provide a substantial margin of safety against precipitation or salting out of the dye in a refrigeration system in the event volatile refrigerant is lost from the system and the dye concentration builds up in the refrigeration oil that stays behind. By providing a suitable large margin of safety, the operator can repeatedly replenish the system by adding the regular dyed refrigeration liquid formulated according to this invention, without fear of causing the concentration of the dye in the system to build up beyond its limit of solubility.

The solubility of several dyes falling within the scope of this invention in various halocarbon refrigerants was also determined. The results are shown in Tables IIIA, IIIB and IIIC.

TABLE IIIA

Solubility of "Dye No. 1-35" In Various Refrigerants at Various Temperatures

| | Solubility, %(wt/wt) at Indicated Temperature | | |
|---|---|---|---|
| Refrigerant | −20° C. | 0° C. | 21° C. |
| R-11 | — | — | 0.2 |
| R-12 | 0.2 | 0.2 | 0.2 |
| R-22 | 0.4 | 0.4 | 0.4 |
| R-502 | <0.1 | <0.1 | 0.1 |

TABLE IIIB

Solubility of 1,4-Bis(mesidino)anthraquinone ("Dye No. 3-25") In Various Refrigerants

| Refrigerant | Solubility, %(wt/wt) At 21° C. |
|---|---|
| R-12 | 0.04 |
| R-22 | 0.1 |
| R-502 | 0.02 |

TABLE IIIC

Solubility of 1,4-Bis(2,6-dimethylanilino)-anthraquinone ("Dye No. 2-31") In Various Refrigerants

| Refrigerant | Solubility, %(wt/wt) At 21° C. |
|---|---|
| R-12 | <0.02 |
| R-22 | 0.04 |
| R-502 | <0.02 |

The above test data show that Dye No. 1-35 possesses substantially greater solubility in the various refrigerants than the other dyes tested, although all of these dyes fall within the scope of this invention. It should be understood that even where the solubility is shown as being less than 0.1%, such solubility is at least in excess of the minimum of 0.01% and sufficient for the purposes of this invention. It should be particularly kept in mind that as long as the solubility of a dye in the halocarbon exceeds a certain minimum, the objectives of the invention can be achieved as long as the solubility of the dye in the refrigeration oil also exceeds the indicated minimum of at least 0.07% and most preferably is above 0.3% based on the oil. Inasmuch as the dyes are ordinarily much more soluble in the refrigeration oils than in the halocarbons, a relatively low solubility of the dye in halocarbons usually suffices.

The foregoing has been provided for the purpose of describing the nature and scope of the invention and suitable modes of using it. It should be understood, however, that the invention is not limited to the exact details described and that modifications may be made therein without departing from the spirit of the invention disclosed and claimed.

What we claim as our invention is:

1. A blue liquid refrigerant composition capable of use as a leak indicator which comprises (a) at least one oil-soluble halocarbon selected from the group consisting of octafluoropropane, octafluorocyclobutane, chloroheptafluorocyclobutane and haloalkanes containing from one to two carbon atoms, from one to six fluorine atoms and from zero to three halogen atoms selected from the group consisting of chlorine and bromine and boiling at a temperature below about 30° C. at atmospheric pressure, and (b) an effective colorant amount of a blue anthraquinone dye corresponding to the formula

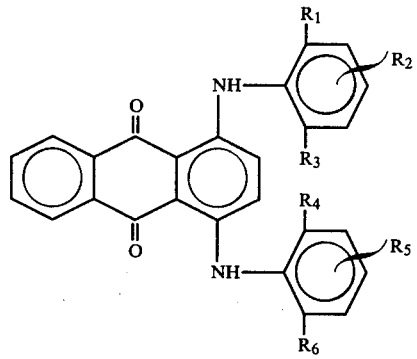

wherein $R_1$, $R_3$, $R_4$ and $R_6$ are each separately selected from the group consisting of methyl and ethyl, and $R_2$ and $R_5$ are each separately selected from the group consisting of hydrogen and methyl, and wherein the total number of carbon atoms in all the alkyl radicals attached to any anilino group in the dye does not exceed three.

2. A liquid composition according to claim 1 wherein the dye is selected from the group consisting of 1,4-bis(2-methyl-6-ethylanilino)anthraquinone, 1,4-bis(2,6-dimethylanilino)anthraquinone and 1,4-bis(2,4,6-trimethylanilino)anthraquinone and is present in the composition in a concentration of at least 0.01%.

3. A liquid composition according to claim 1 wherein the halocarbon is selected from the group consisting of trichlorofluoromethane, dichlorodifluoromethane, chlorodifluoromethane and an azeotrope of chlorodifluoromethane mixed with chloropentafluoroethane, and wherein the dye is dissolved in the composition in a concentration of at least 0.01%.

4. A leak detecting composition according to claim 1 wherein the composition comprises a refrigeration oil in addition to the halocarbon and the dye, the halocarbon being present in the composition in a proportion in the range from about 40 to about 90% and the refrigeration oil being correspondingly present in a proportion in the range from about 60 to about 10%.

5. A process for monitoring leaks in a vapor compression heat transfer system which comprises circulating through said system a composition as defined in claim 4.

6. A blue, leak-indicating refrigeration liquid which comprises
(a) at least one oil-soluble halocarbon selected from the group consisting of octafluoropropane, octafluorocyclobutane, chloroheptafluorocyclobutane and haloalkanes containing from one to two carbon atoms, from one to six fluorine atoms and from zero to three halogen atoms selected from the group consisting of chlorine and bromine and boiling at a temperature below about 30° C. at atmospheric pressure,
(b) a refrigeration oil composed essentially of a refined mineral oil having a pour point of between about 0° and −50° C., and
(c) a blue anthraquinone dye corresponding to the formula

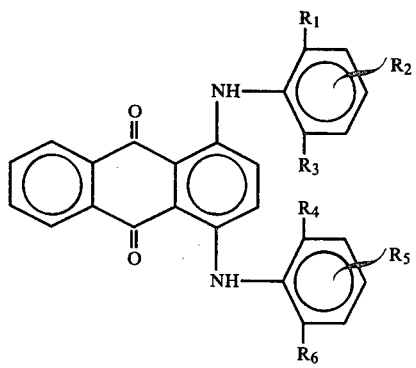

wherein $R_1$, $R_3$, $R_4$ and $R_6$ are each separately selected from the group consisting of methyl and ethyl, and $R_2$ and $R_5$ are each separately selected from the group consisting of hydrogen and methyl, and wherein the total number of carbon atoms in all the alkyl radicals attached to any anilino group in the dye does not exceed three, wherein the proportion of halocarbon to refrigeration oil is between about 10:1 and about 4:6 and wherein the concentration of dye in the liquid is between about 0.01 and 0.5%.

7. A leak-indicating refrigeration liquid according to claim 6 wherein the halocarbon is selected from the group consisting of trichlorofluoromethane, dichlorodifluoromethane, chlorodifluoromethane, trifluoromethane, chlorofluoromethane, methylene fluoride, bromotrifluoromethane, chlorotrifluoromethane, chloropentafluoroethane, 1,1-difluoroethane, and azeotropes of two or more of the foregoing.

8. A leak-indicating refrigeration liquid according to claim 6 wherein the dye is 1,4-bis(2-methyl-6-ethylanilino)anthraquinone.

9. A leak-indicating refrigeration liquid according to claim 6 wherein the dye is 1,4-bis(mesidino)anthraquinone.

10. A leak-indicating refrigeration liquid according to claim 6 wherein the refrigeration oil is a naphthenic oil and the dye is at least one member selected from the group consisting of 1,4-bis(2-methyl-6-ethylanilino)anthraquinone, 1,4-bis(2,6-dimethylanilino)anthraquinone and 1,4-bis(2,4,6-trimethylanilino)anthraquinone.

11. A process for monitoring leaks in a vapor compression heat transfer system which comprises circulating through said system a composition as defined in claim 8.

* * * * *